United States Patent
Araki et al.

(10) Patent No.: US 11,995,364 B2
(45) Date of Patent: May 28, 2024

(54) IMAGE FORMING APPARATUS HAVING A SECURITY MECHANISM FOR CONTROLLING THE CONTENT OF A PRINTED DOCUMENT AND CONTROL METHOD THEREOF

(71) Applicant: CANON KABUSHIKI KAISHA, Tokyo (JP)

(72) Inventors: Keishi Araki, Ibaraki (JP); Yuichiro Shibuya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/840,031

(22) Filed: Jun. 14, 2022

(65) Prior Publication Data

US 2022/0405031 A1    Dec. 22, 2022

(30) Foreign Application Priority Data

Jun. 16, 2021   (JP) .................................. 2021-100274
Apr. 4, 2022   (JP) .................................. 2022-062254

(51) Int. Cl.
*G06F 3/12* (2006.01)
*H04N 1/44* (2006.01)

(52) U.S. Cl.
CPC .......... *G06F 3/1238* (2013.01); *G06F 3/1222* (2013.01); *H04N 1/444* (2013.01)

(58) Field of Classification Search
None
See application file for complete search history.

(56) References Cited

U.S. PATENT DOCUMENTS

2010/0046015 A1   2/2010   Whittle et al.
2021/0173598 A1   6/2021   Nagai

FOREIGN PATENT DOCUMENTS

| JP | 2010049520 A | 3/2010 | | |
|---|---|---|---|---|
| WO | WO-0051338 A1 | * | 8/2000 | ......... H04N 1/00843 |
| WO | WO-2012045861 A1 | * | 4/2012 | ........... G06F 21/608 |

OTHER PUBLICATIONS

English translation of WO-0051338-A1 (Year: 2000).*

* cited by examiner

*Primary Examiner* — Thomas D Lee
(74) *Attorney, Agent, or Firm* — Canon U.S.A., Inc. IP Division

(57) ABSTRACT

An image forming apparatus is provided that includes mechanisms for registering strings, extracting text information from received job data, determining a job availability of the received job data based on a comparison of the extracted text information with the registered strings, associating a result of the determination of job availability with the received job data and storing the result of the determination of job availability and the received job data; and controlling an execution of the received job data based on the result of the determination of job availability, in response to receiving an execution instruction of the received job data.

17 Claims, 16 Drawing Sheets

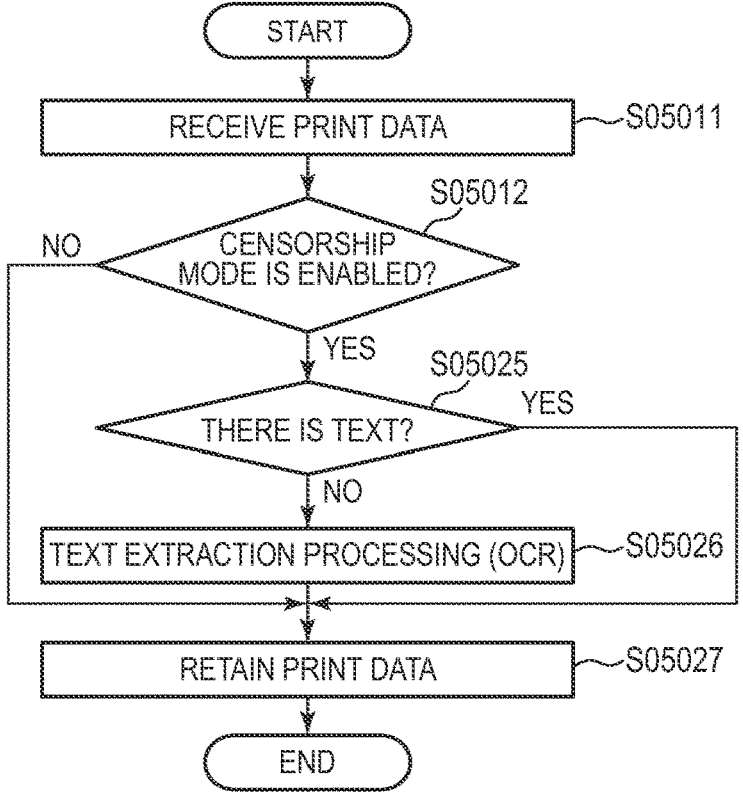
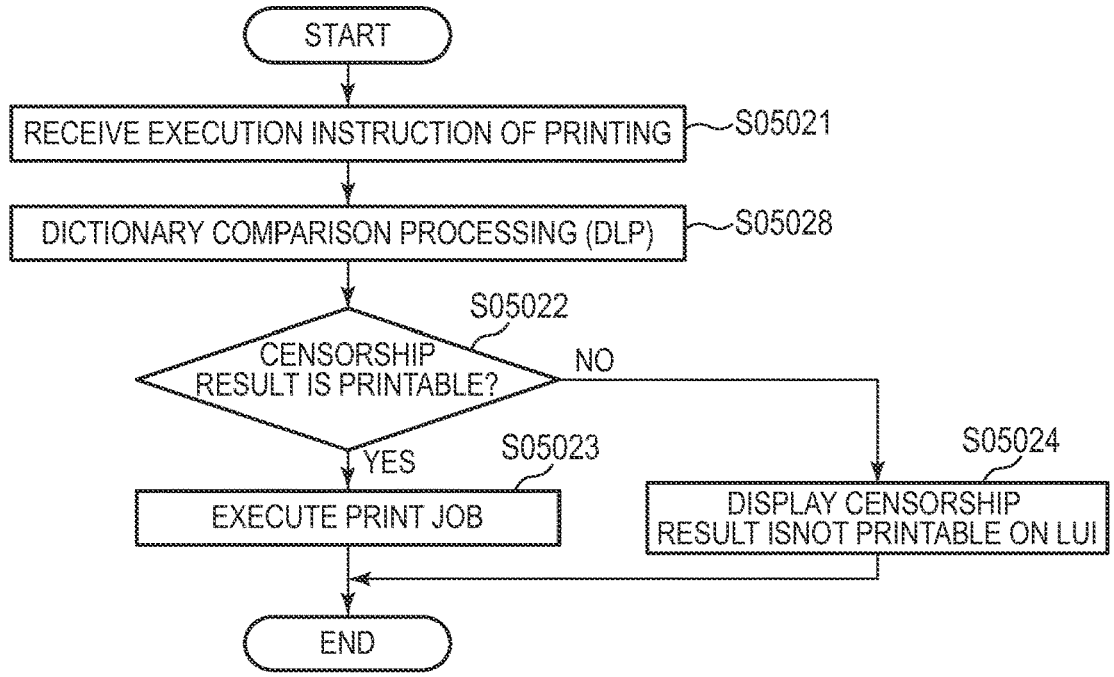

IMAGE FORMING APPARATUS HAVING A SECURITY MECHANISM FOR CONTROLLING THE CONTENT OF A PRINTED DOCUMENT AND CONTROL METHOD THEREOF

BACKGROUND

Field

The present disclosure relates to an image forming apparatus, a control method of the image forming apparatus, and a storage medium.

Description of the Related Art

The location where a printing apparatus is installed and the environment of the user can vary, and in addition to the use method of accessing the printing apparatus inside a firewall, the use method of accessing the printing apparatus directly from an external network such as the Internet is also increasing. In addition, information leakage has become problem; information leakage is caused by an attack by an unauthorized operation of the printing apparatus by a malicious user, whether inside or outside a firewall, or a loss of a printed document.

Technique are known for censoring the content of a printed document as one of the security measures for a printing apparatus.

According to Japanese Patent Application Laid-Open No. 2010-49520, there is proposed a technique for censoring whether or not pre-registered words exist in print data after an execution instruction of printing is received and before execution of printing.

However, if the print data is compared with the pre-registered words after the receipt of the execution instruction of printing and before the execution of printing, the time increases from the reception of the execution instruction of printing from the user to the print completion.

SUMMARY

Various embodiments of the present disclosure prevent information leakage without increasing the time from the receipt of the execution instruction of printing from the user to the print completion by executing a dictionary comparison process before the receipt of the execution instruction of printing.

According to one embodiment, an image forming apparatus is provided that includes an operation unit that performs the following: registering strings; receiving job data, extracting text information from the received job data determining a job availability of the received job data based on a comparison of the extracted text information with the registered strings, associating a result of the determination of job availability with the received job data and storing the result of the determination of job availability and the received job data, and controlling an execution of the received job data based on the result of the determination of job availability, in response to receiving an execution instruction of the received job data.

Further features of the present disclosure will become apparent from the following description of example embodiments with reference to the attached drawings.

BRIEF DESCRIPTION OF THE DRAWINGS

FIG. 4C is a flowchart showing another example of a process flow of the multifunction peripheral from print data entry to retention according to the first embodiment.

FIG. 4D is a flowchart showing another example of a process flow of the multifunction peripheral after receipt of execution instruction of printing from the user according to the first embodiment.

DESCRIPTION OF THE EMBODIMENTS

Hereinafter, some example embodiments for carrying out features of the present disclosure will be described with reference to the drawings. According to one embodiment, a multifunction machine (digital multifunction machine/MFP/ Multi-Function Peripheral) having a retain-and-print function is described. The retention printing function is a function in which a print job sent from a PC, for example, is not immediately output from the MFP, but is once retained in an HDD or an external storage device of the MFP.

However, the scope of the present disclosure is not limited to MFPs. In other embodiments of the present disclosure, for example, features of the present disclosure may be applied to other apparatuses having a retain-and-print function, such as a single-function peripheral (SFP).

First Embodiment

Figure 1:
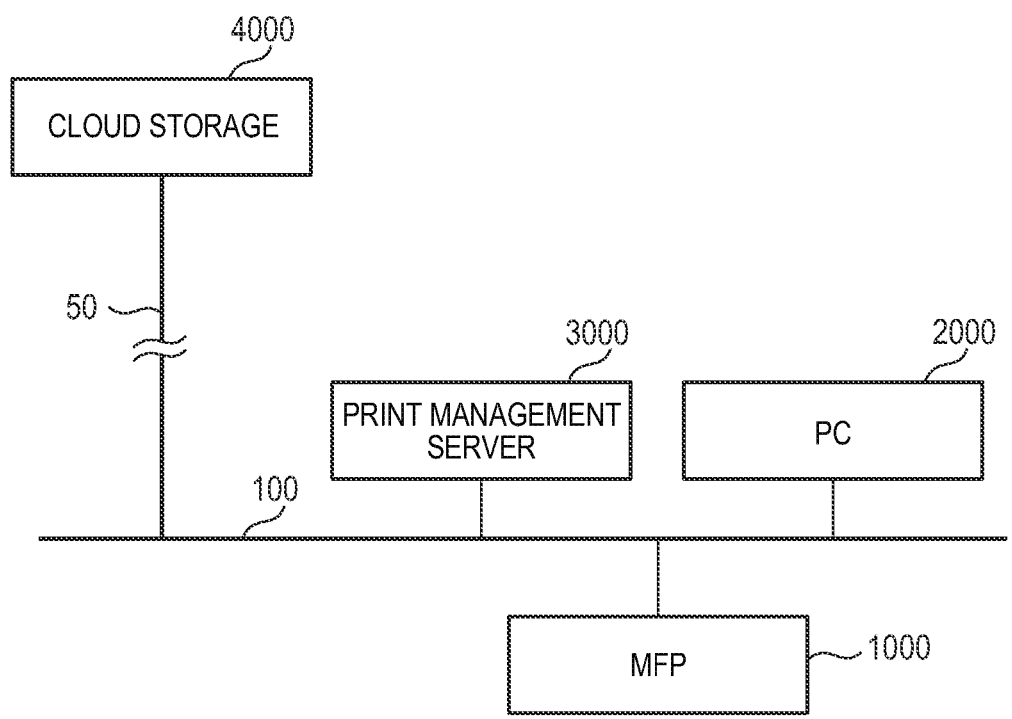
FIG. 1 is a block diagram illustrating an example configuration of a system according to a first embodiment.

FIG. 1 is a diagram showing a system configuration of the first embodiment. An MFP 1000 having a printing function for forming an image on a sheet can transmit and receive print data (also referred to as a print job), scanned image data, device management information, and the like via a network 100 to/from other information processing apparatuses.

The MFP 1000 can also communicate with the print management server 3000 via the network 100. A print management server 3000 and a PC 2000 can communicate with cloud storage or a file server via an external network 50. Although FIG. 1 shows one MFP, one print management server 3000, and one cloud storage 4000 as an example, a plurality of MFPs 1000, a plurality of print management servers, and a plurality of cloud storage servers may be provided. Although the MFP 1000 is separated from the print management server 3000 in FIG. 1, the role of the print management server 3000 may be included in the MFP 1000.

Figure 2A:
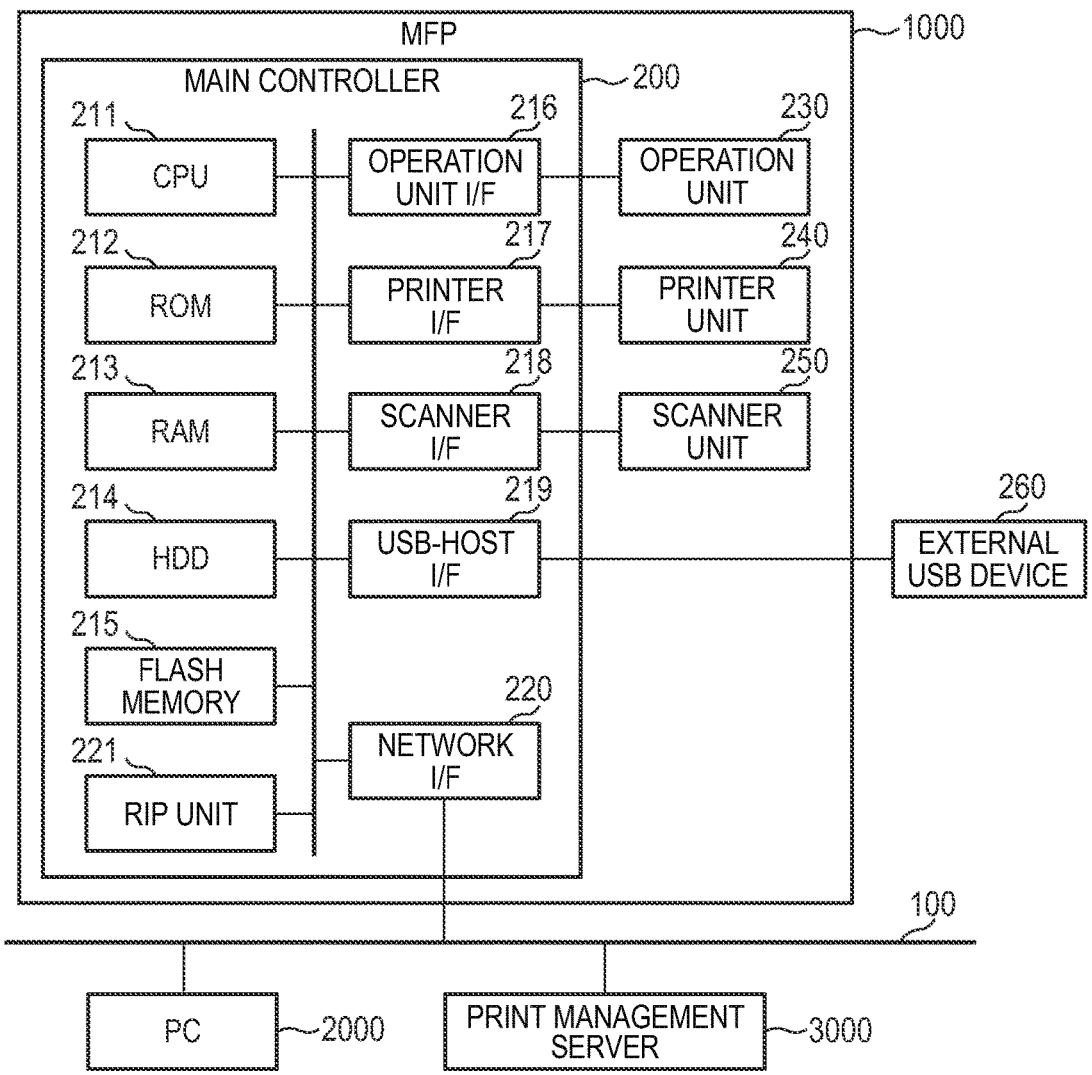
FIG. 2A is a block diagram illustrating an example hardware configuration of a multifunction peripheral according to the first embodiment.

FIG. 2A is a block diagram showing a hardware configuration of the MFP 1000. A CPU 211 executes the software program of the MFP 1000 and controls the entire apparatus. A ROM 212 is a read-only memory and stores a boot program, fixed parameters, and the like of the MFP 1000. A RAM 213 is a random-access memory used for storing programs and temporary data when the CPU 211 controls the MFP 1000. An HDD 214 is a hard disk drive for storing system software, applications, and various data. The CPU 211 executes the boot program stored in the ROM 212, deploys the program stored in the HDD 214 into the RAM 213, and executes the deployed program to control the operation of the MFP 1000.

A flash memory 215 stores a loader, a kernel, and an application. In addition to the execution program, the flash memory 215 stores license information for enabling the function of the MFP 1000, and a signature and a public key used for verification used for detecting tampering of the program. An operation unit I/F 216 is an I/F for transmitting an instruction input by the user of the MFP 1000 via an operation unit 230 to the CPU 211. The operation unit I/F 216 receives the processing content for switching the content to be displayed on the operation unit 230 from the CPU 211 and transmits the processing content to the operation unit 230. The operation unit 230 is provided with a liquid crystal display unit having a touch panel function, a keyboard, or the like. The operation unit 230 displays the state and the operation menu of the MFP 1000 to receive instructions from the user.

A raster image processor (RIP) unit 221 performs rendering processing on the print data to acquire a raster image.

A printer I/F 217 controls printing processing by a printer unit 240. A scanner I/F 218 controls scanning processing of a document by a scanner unit 250. A USB-Host I/F 219 is an interface for connecting a main controller 200 and an external USB device 260. An example of the external USB device 260 is a FAX unit. In the FAX unit, FAX transmission is performed based on image data transferred from the HDD 214 via the USB-Host I/F 219. Image data are generated based on the received data, and the image data are transferred to the HDD 214 via the USB-Host I/F 219. The image data stored in the HDD 214 is printed on the storage medium by the printer unit 240 as described above. Examples of the external USB device 260 include a USB flash drive or a USB keyboard. The USB thumb drive can also transfer update files needed for firmware updates. A network I/F 220 controls transmission and reception of data to/from the network 100.

Figure 2B:
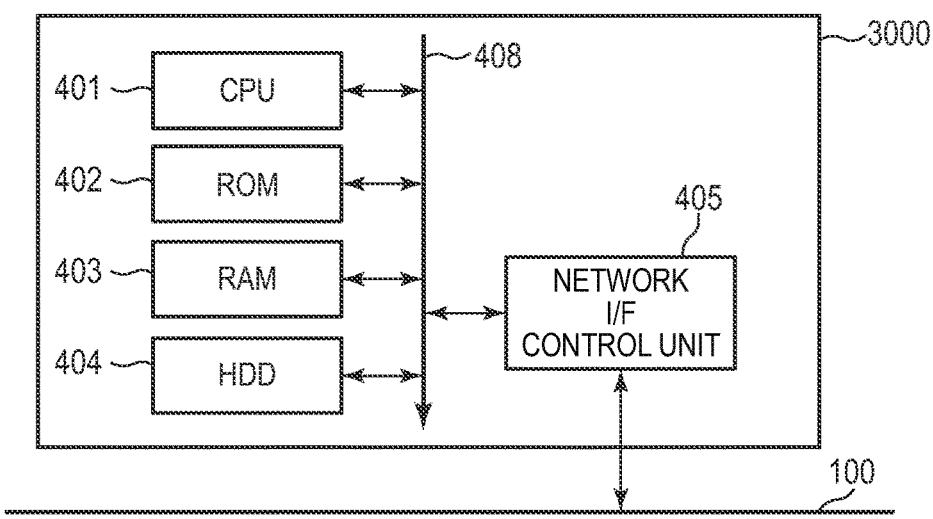
FIG. 2B is a block diagram illustrating an example hardware configuration of a print management server according to the first embodiment.

FIG. 2B is a block diagram showing a hardware configuration of the print management server 3000. A CPU 401 executes the software program of the print management server 3000 and controls the entire apparatus. A ROM 402 is a read-only memory and stores boot programs, fixed parameters, and the like of the print management server 3000. A RAM 403 is a random access memory used for storing programs and temporary data when the CPU 401 controls the print management server 3000. An HDD 404 is a hard disk drive for storing system software, applications and various data. The CPU 401 executes the boot program stored in the ROM 402, deploys the program stored in the HDD 404 into the RAM 403, and executes the deployed program to control the operation of the print management server 3000. A network I/F control unit 405 controls transmission and reception of data to/from the network 100. A bus 408 interconnects the CPU 401, the ROM 402, the RAM 403, the HDD 404, and the network I/F control unit 405. Control signals from the CPU 401 and data signals between the apparatuses are transmitted and received via the bus 408.

Figure 3A:
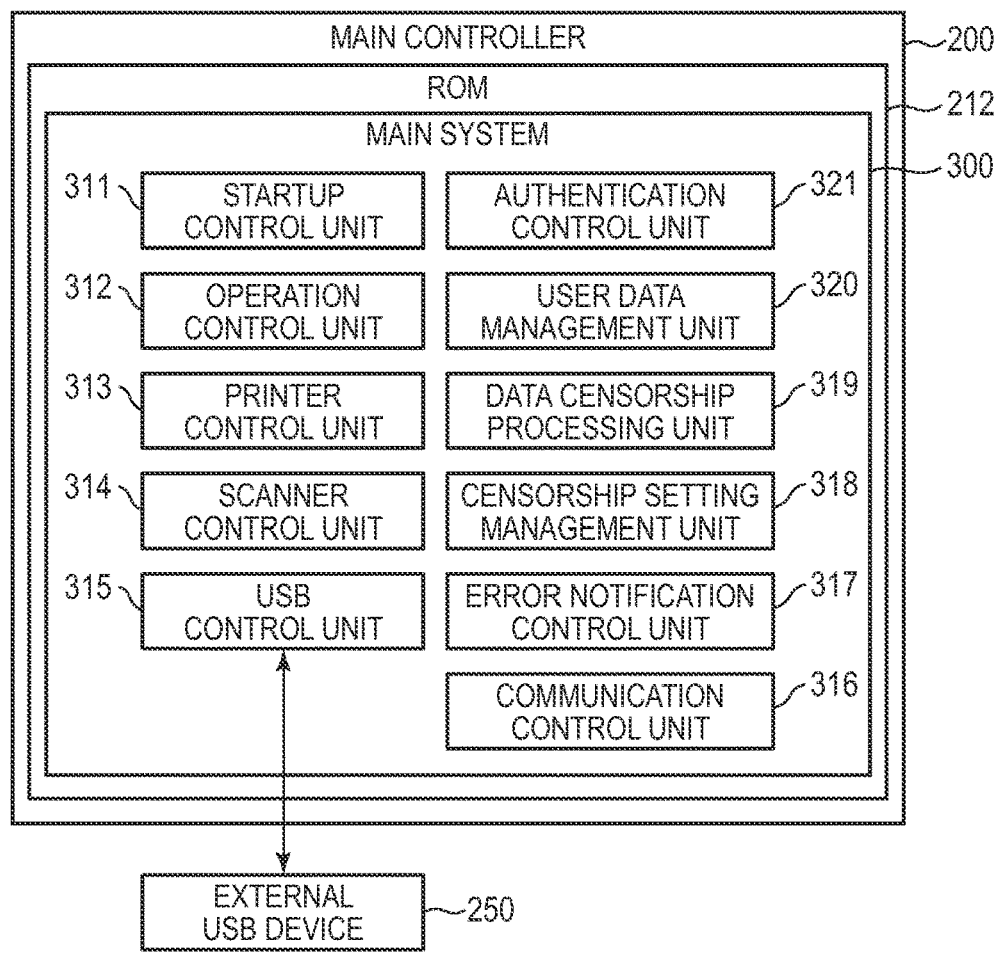
FIG. 3A is a block diagram illustrating an example software configuration of the multifunction peripheral according to the first embodiment.

FIG. 3A is a block diagram showing a configuration of software modules of the MFP 1000. The software modules in FIG. 3A are implemented by executing a program deployed in the RAM 213 by the CPU 211.

A startup control unit 311 is a program for controlling a process at startup of the MFP 1000 and starts the OS (operating system) of the main controller 200 to start up a basic system for operating various programs. An operation control unit 312 is a program for controlling the operation unit 230 via the operation unit I/F 216. A printer control unit 313 controls printing by the printer unit 240. A scanner control unit 314 is a module for executing functions such as scanning a document by the scanner unit 250. A USB control unit 315 is a program for controlling the USB device via the USB-Host I/F 219. A communication control unit 316 is a module for controlling a plurality of communication protocols supported by the MFP 1000 via the network I/F 220. When a problem is detected in the content of the print data by the print data censorship processing, an error notification control unit 317 controls the error content to be notified to the operation unit 230 and the external apparatuses connected via the network 100.

A censorship setting management unit 318 is a program for managing the settings of pre-registered words. The pre-registered words are also referred to as keywords indicating confidentiality or pre-registered character strings. An administrator managing the MFP 1000 provides setting values related to censorship processing such as input pre-registered words to a data censorship processing unit 319 at the time of the print data is censored.

The data censorship processing unit 319 is a program for controlling the censorship processing of the print data based on the pre-registered words registered by the censorship setting management unit 318.

A user data management unit 320 is a program for managing data of a user who can use the MFP 1000. An authentication control unit 321 controls the authentication of the user who requests the MFP 1000 for user authentication based on the user information registered by the user data management unit 320.

Figure 3B:
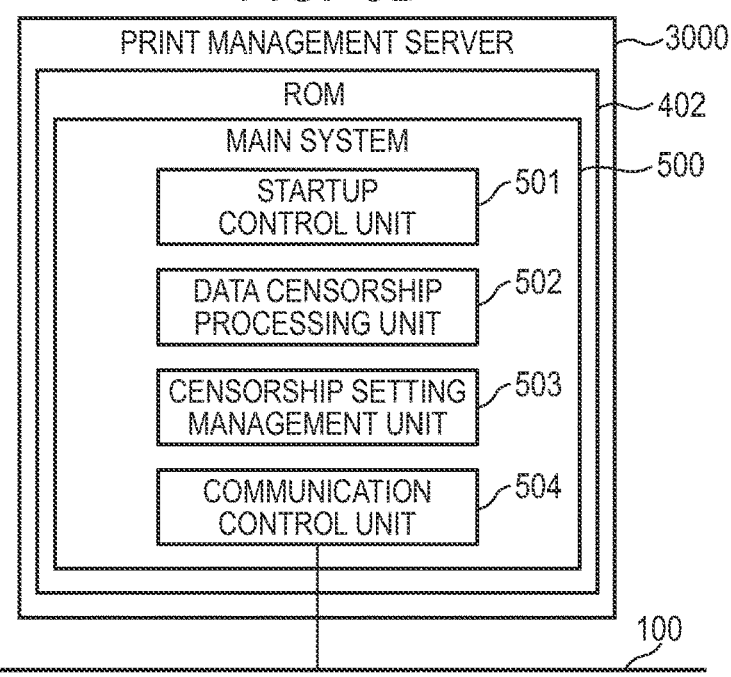
FIG. 3B is a block diagram illustrating an example software configuration of the print management server according to the first embodiment.

FIG. 3B is a block diagram showing a configuration of software modules of the print management server 3000 in the present embodiment. The software modules in FIG. 3B are implemented by executing a program deployed in the RAM 403 by the CPU 401.

A startup control unit 501 is a program for controlling processing at startup of the print management server 3000 and starts the OS (operating system) of the print management server 3000 to start up a basic system for operating various programs. A communication control unit 504 is a module for controlling a plurality of communication protocols supported by the print management server 3000 via the network I/F control unit 405. A censorship setting management unit 503 is a program for managing the settings of pre-registered words. A data censorship processing unit 502 is a module for controlling the censorship processing of the print data based on the pre-registered words registered by the censorship setting management unit 503.

In the following sequence and flowchart, the portion to be processed by the print management server 3000 is stored in one of the storage means of the ROM 402, the RAM 403, and the HDD 404, and executed by the CPU 401.

Figure 4A:
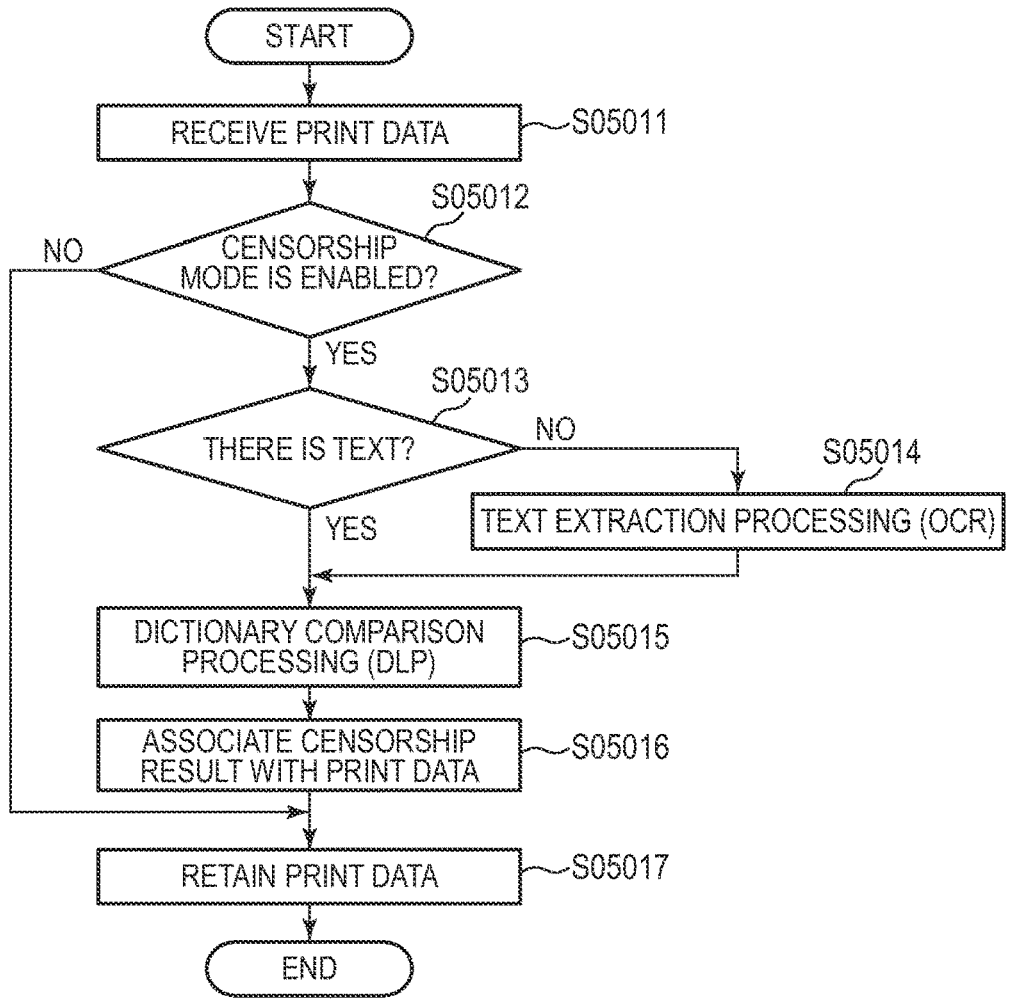
FIG. 4A is a flowchart showing an example process flow of the multifunction peripheral from print data entry to retention according to the first embodiment.

FIG. 4A is a flowchart showing a process flow of the MFP 1000 from the time when print data is entered from the PC 2000 to the time when the print data is retained in the MFP 1000 according to the present embodiment. The program for implementing the operation described in this flowchart is stored in the flash memory 215 and is deployed and executed in the RAM 213 by the CPU 211.

First, in step S05011, the MFP 1000 receives a print data input by the user. Specifically, the user transmits the print data from the PC 2000 to the MFP 1000 via the network 100. The data entered in step S05011 may be in PDF (Portable Document Format) format or PDL (Page Description Language) format and is not limited thereto.

Subsequently, in step S05012, the main controller 200 acquires the set value registered in the censorship setting management unit 318 and confirms whether or not the censorship mode of the MFP 1000 is enabled. If it is determined that the censorship mode is enabled (YES in S05012), the process proceeds to step S05013. On the other hand, if it is determined that the censorship mode is disabled (NO in S05012), the process proceeds to step S05017 without executing the censorship processing.

In step S05013, the data censorship processing unit 319 determines whether or not there is a text for the print data. If it is determined that there is no text (NO in S05013), the process proceeds to step S05014. On the other hand, if there is text (YES in S05013), the process proceeds to step S05015. The text described here refers, for example, to PDL data or text information of a searchable PDF.

In step S05014, the data censorship processing unit 319 performs text extraction processing (OCR: Optical Character Reader) on the print data to extract text information from the print data. Thereafter, the process proceeds to step S05015.

In step S05015, the data censorship processing unit 319 performs processing to determine whether or not the pre-registered words exist in the text of the print data (dictionary comparison processing: DLP). When the pre-registered words exist, it is determined that printing is disabled. When the pre-registered words do not exist, it is determined that printing is enabled. The pre-registered words are words registered in the censorship setting management unit 318 by the administrator, and the registration method thereof will be described later. Then, the process proceeds to step S05016.

In step S05016, the main controller 200 performs processing for associating (linking) the censorship result (printable or not printable) determined in step S05015 with the print data. Then, the process proceeds to step S05017.

In step S05017, the main controller 200 retains the print data associated with the censorship result in a storage medium such as the HDD 214 or the flash memory 215 of the MFP 1000. Further, the storage medium stores the print data associated with the censorship result. The print data retained in step S05017 may be PDL data or a raster image after rendering processing by the RIP unit 221.

Figure 4B:
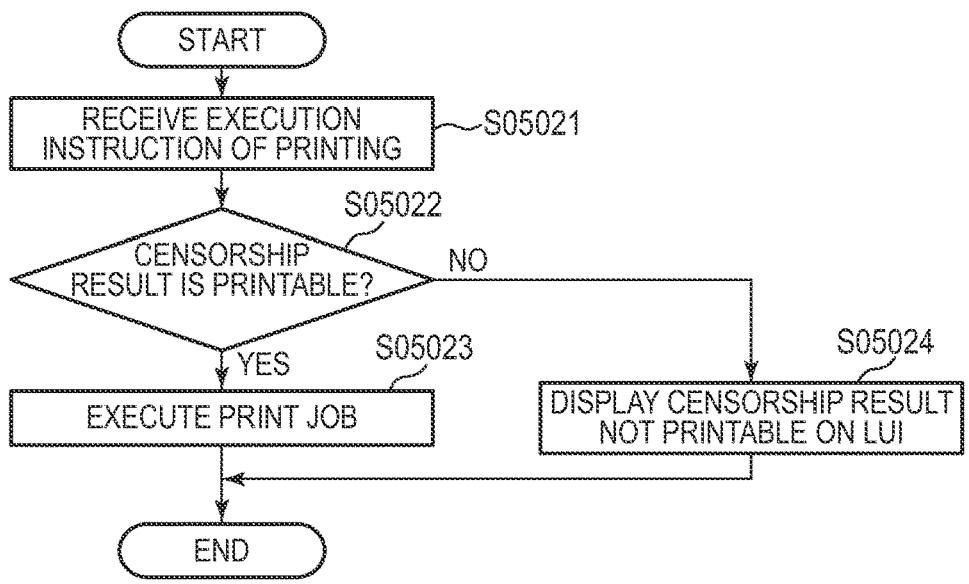
FIG. 4B is a flowchart showing an example process flow of the multifunction peripheral after receipt of an execution instruction of printing from a user according to the first embodiment.

FIG. 4B is a flowchart showing a process flow of the MFP 1000 from the time when the MFP 1000 receives the execution instruction of printing to the time when the MFP 1000 prints the print data in the system according to the present embodiment. The flowchart starts at the time when the MFP 1000 authenticates the user and displays the job list of the print job to be retained on the LUI (Local User Interface: the operation unit 230) of the MFP 1000, for example.

First, in step S05021, the MFP 1000 receives the execution instruction of printing from the user. More specifically, the user operates an execution instruction of printing of any print jobs from the job list of the retained print displayed on the LUI of the MFP 1000. Here, the job list of the retained print refers to the print job retained in step S05017. Although the description has been made by the user operating the execution instruction of printing of any print jobs from the job list of the retained print displayed on the LUI of the MFP 1000, a job without printing may be used, and the instruction received from the user is not limited to a job with printing.

Next, in step S05022, the main controller 200 determines a censorship result associated with the print data instructed in S05021. If the censorship result is printable (YES in S05022), the process proceeds to step S05023, and the printer control unit 313 executes the print job. If the censorship result is not printable (NO in S05022), the process proceeds to step S05024. Here, the job to be executed is not limited to a job involving printing. For example, the job to be executed may be a job transmitting data.

In step S05024, the error notification control unit 317 displays an error screen (FIG. 5) notifying the operation unit 230 of the MFP 1000 that the censorship result is not printable.

Figure 5:
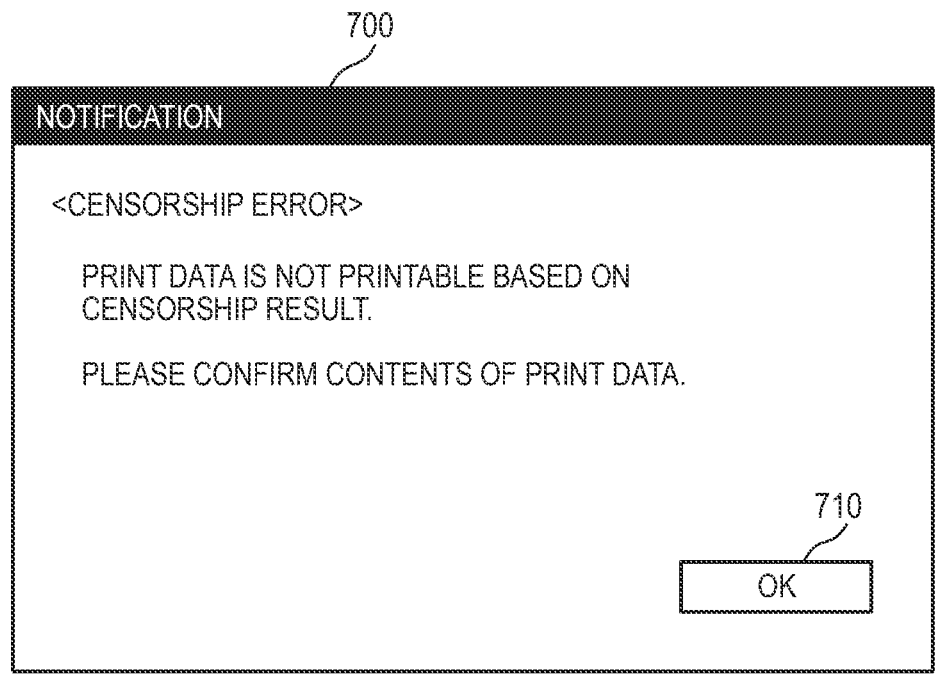
FIG. 5 is an illustration of an example notification screen that is used when a censorship error occurs according to one embodiment.

FIG. 5 shows an example of an error screen to be displayed on the operation unit 230 when the censorship result is not printable in step S05024. The screen 700 includes an error message for notifying the user of a request to confirm the contents of the print data and an OK button 710. When the button 710 is pressed, the error screen displayed on the operation unit 230 is closed.

As described above, it is possible to end the censorship processing using the pre-registered words before the execution instruction of printing from the user, and it is possible to prevent information leakage without increasing the time from the execution instruction of printing by the user to the end of printing.

Next, a modified example of a process flow of the MFP 1000 from the time when print data is entered from the PC 2000 to the time when the print data is censored and printing is executed will be described with reference to FIGS. 4C and 4D. FIG. 4C shows a flowchart of a process flow of the MFP 1000 from the time when the print data is entered from the PC 2000 to the time when the print data is retained in the MFP 1000 according to the present embodiment. The program for implementing the operation described in this flowchart is stored in the flash memory 215 and is deployed and executed in the RAM 213 by the CPU 211. Processes similar to those in FIGS. 4A and 4B are denoted by similar numbers.

First, in step S05011, the MFP 1000 receives a print data input by the user. Subsequently, in step S05012, the main controller 200 acquires the set value registered in the censorship setting management unit 318 and confirms whether or not the censorship mode of the MFP 1000 is enabled. If it is determined that the censorship mode is enabled (YES in S05012), the process proceeds to step S05025. On the other hand, if it is determined that the censorship mode is disabled (NO in S05012), the process proceeds to step S05027 without executing the censorship processing.

In step S05025, the data censorship processing unit 319 determines whether or not there is text for the print data. If it is determined that there is no text (NO in S05025), the process proceeds to step S05026. On the other hand, if there is text (YES in S05025), the process proceeds to step S05027.

In step S05026, the data censorship processing unit 319 performs text extraction processing (OCR: Optical Character Reader) on the print data to extract text information from the print data. Thereafter, the process proceeds to step S05027.

In step S05027, the main controller 200 retains the print data in the storage medium such as the HDD 214 or the flash memory 215 of the MFP 1000. When the text extraction processing is performed in S05026, the extracted text information is associated with the print data and stored in the storage medium. The print data retained in step S05017 may be PDL data or a raster image after rendering processing by the RIP unit 221.

FIG. 4D shows a modified flowchart of a process flow of the MFP 1000 from the time when the MFP 1000 receives the execution instruction of printing to the time when the MFP 1000 prints the print data in the system according to the present embodiment. The start of the flowchart starts at the time when the MFP 1000 authenticates the user and displays the job list of the print job to be retained on the LUI (Local User Interface: the operation unit 230) of the MFP 1000, for example.

First, in step S05021, the MFP 1000 receives the execution instruction of printing from the user. Next, in step S05028, the data censorship processing unit 319 performs processing to determine whether or not the pre-registered words exist in the text of the print data (dictionary comparison processing: DLP). When the pre-registered words exist, it is determined that printing is disabled. When the pre-registered words do not exist, it is determined that printing is enabled. The pre-registered words are words registered in the censorship setting management unit 318 by the administrator. Then, the process proceeds to step S05022.

Next, in step S05022, the main controller 200 determines a censorship result associated with the print data instructed in S05021. If the censorship result is printable (YES in S05022), the process proceeds to step S05023, and the printer control unit 313 executes the print job. If the printable result is not printable (NO in S05022), the process proceeds to step S05024.

In step S05024, the error notification control unit 317 displays an error screen (FIG. 5) notifying the operation unit 230 of the MFP 1000 that the censorship result is not printable.

As described above, before the execution instruction of printing from the user, it is possible to end the text extraction processing for the censorship processing. After the execution instruction of printing from the user, the censorship processing can be performed by the dictionary comparison processing using the latest pre-registered words. Therefore, it is possible to prevent information leakage while shortening the time from the execution instruction of printing by the user to the end of printing.

Figure 6:
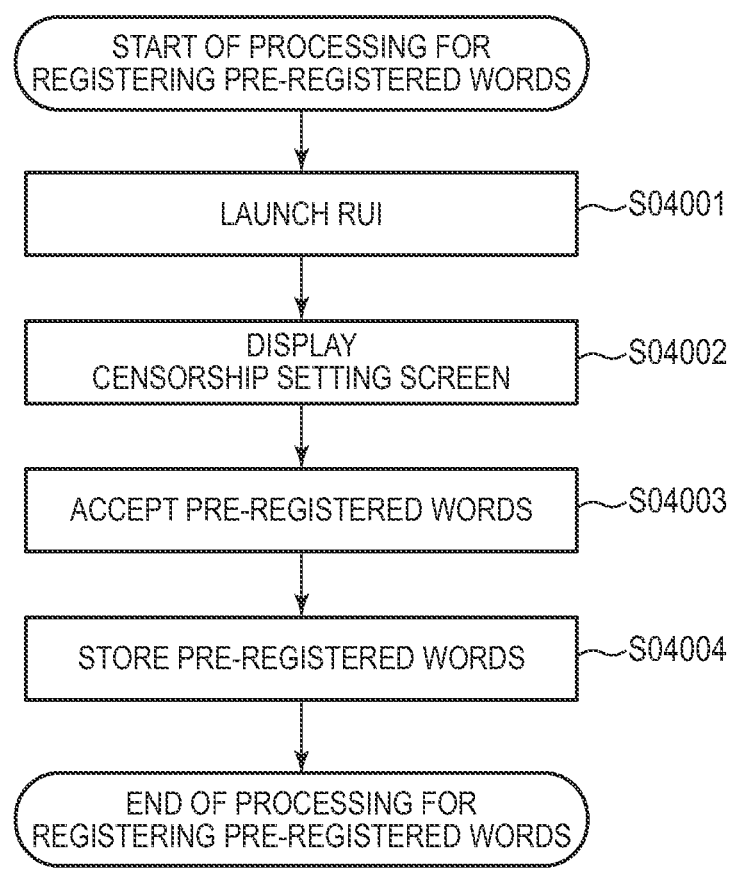
FIG. 6 is a flowchart showing an example process flow for registering pre-registered words according to the first embodiment.

FIG. 6 shows a flowchart of a process for registering pre-registered words, which is used in the dictionary comparison processing (DLP) performed in S05015. The pre-registered words are, for example, words indicating confidential information. The pre-registered words are registered by an administrator managing the MFP 1000. For example, if the text information of the print data contains the pre-registered words, it is determined that the print data includes the confidential information. MFP 1000 determines that print data is not printable and does not print the print data including confidential information. Accordingly, the print data does not become a print document, and it is possible to reduce a security risk leading to information leakage.

In step S04001, the MFP 1000 is connected to the PC 2000 via the network 100, and a screen capable of operating the MFP 1000 is displayed on the web browser of the PC 2000. An operation unit of the MFP 1000 displayed on the PC or the mobile terminal is called a remote UI (user interface, remote user interface: RUI). In step S04002, the main controller 200 of the MFP 1000 displays a censorship setting screen 600 (FIG. 7) for registering the pre-registered words on the RUI.

Figure 7:
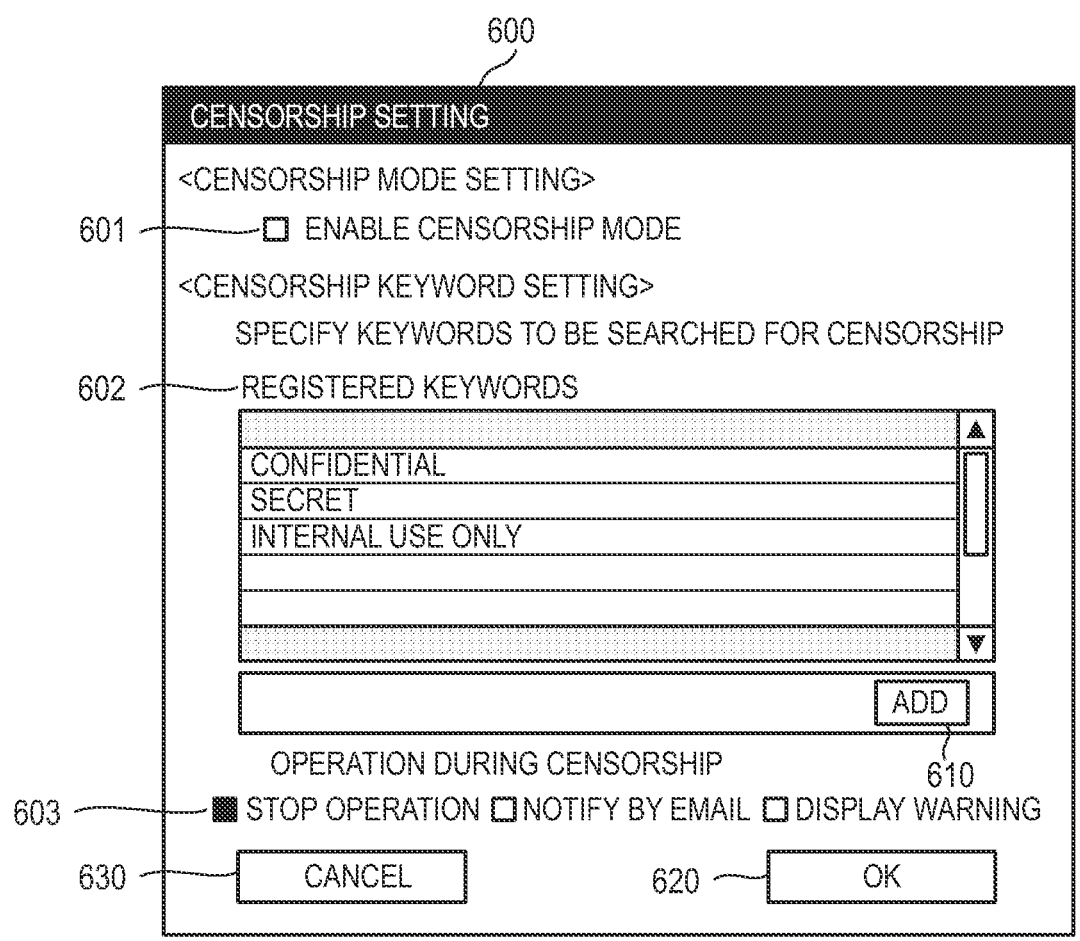
FIG. 7 is an illustration of an example setting screen for the pre-registered words according to one embodiment.

FIG. 7 shows an example of a censorship setting screen for registering the pre-registered words. The screen 600 includes a censorship mode setting 601, a censoring keyword setting 602, a censoring operation setting 603, an adding button 610, an OK button 620, and a cancel button 630. The censorship mode setting 601 is a button for enabling the censorship mode. When the user (administrator) inputs words to be pre-registered and presses the adding button 610, the adding button 610 adds the word to be pre-registered to an item of registered keywords. In FIG. 7, "confidential", "secret", and "internal use only" are registered as words as examples of the pre-registered words. The censoring operation setting 603 can set the operation of the MFP 1000 when the MFP 1000 receives the execution instruction of printing for a document including the pre-registered words at the time of censoring. In FIG. 7, "stop operation", "notify (administrator) by e-mail", and "display warning (to user)" can be selected. Although "stop operation" is selected in FIG. 7, this is only as an example of the operation, and a plurality of options may be selected simultaneously.

When the button 620 is pressed, the input setting data is registered in a censorship setting management unit 318. Next, in step S04003, the pre-registered words input by the user is accepted. Then, in step S04004, the pre-registered words input in step S04003 is stored in the censorship setting management unit 318. When the storage is completed, the registration processing of the pre-registered words is finished.

Further, although in the present embodiment, the registration processing is performed via the remote UI in the registration processing of the pre-registered words, the method of performing the registration processing of the pre-registered words is not particularly limited, for example, the registration is performed from the operation unit 230 of the MFP 1000.

Second Embodiment

In the first embodiment, on the assumption of the retain-and-print operation, when the MFP 1000 receives the print data, the MFP 1000 subsequently performs the censorship processing on the print data and retains the print data associated with the censorship result. When the MFP 1000 receives the execution instruction of printing from the user, the MFP 1000 executes or restricts printing the print data based on the censorship result associated with the print data.

In a case where there is a large time interval between an entry of print data and an execution instruction of printing by a user, it is assumed that after the MFP 1000 performs censorship processing and associates a print job with the censorship result, the administrator managing the MFP 1000 may change or update the pre-registered words or change the censorship mode setting. In such a case, the retained print job is censored with the previously pre-registered words rather than the latest pre-registered words. Therefore, the print data is associated with the previous pre-registered words rather than the latest pre-registered words.

In the second embodiment, assuming the above case, a control method for always executing and restricting printing based on the latest censorship result will be described. Specifically, a control method for always censoring the retained print data by using the latest censorship mode and the latest pre-registered words, and always associating the latest censorship result with the print data will be described.

In the second embodiment, the network configuration diagram, the hardware configuration of the MFP 1000, which is an information processing apparatus, the software configuration, the reception of an execution instruction of printing, the printing processing such as execution of printing, and the like are the same as those in the first embodiment.

Figure 8B:
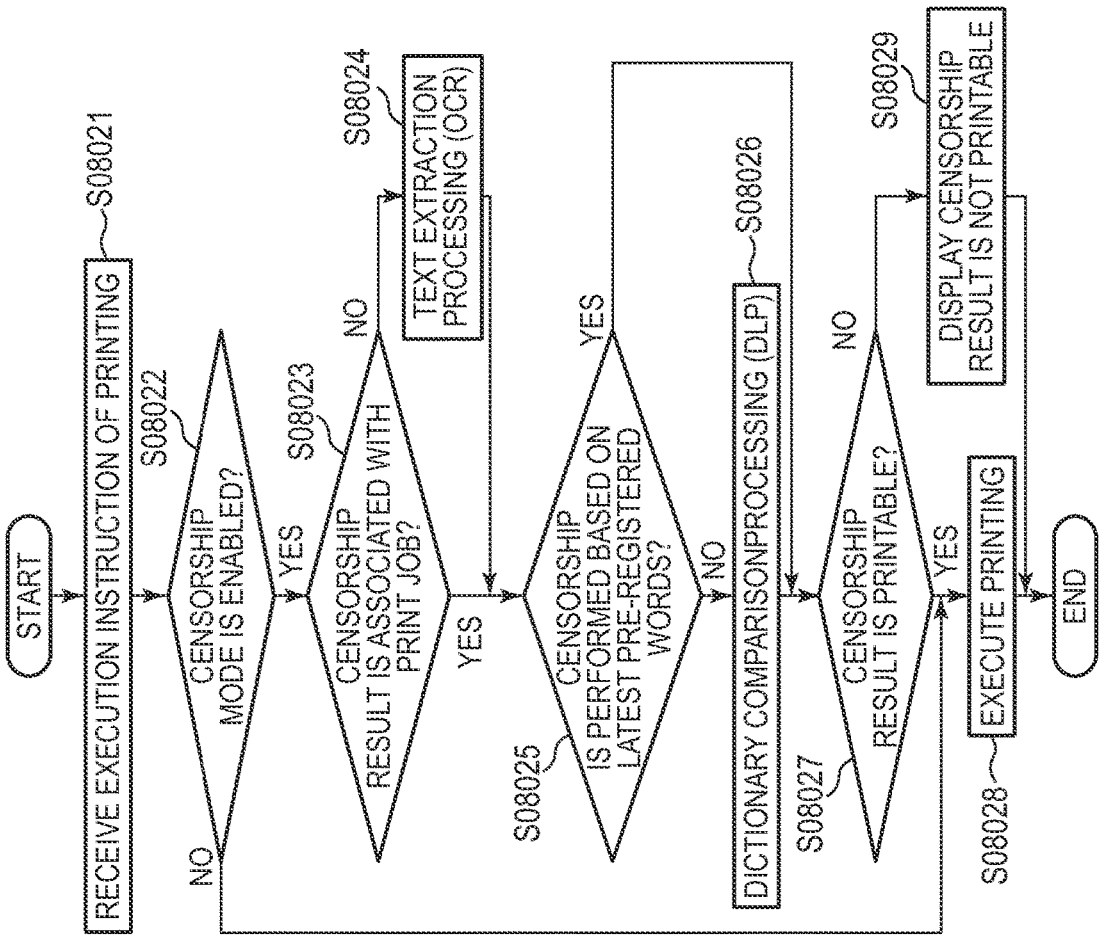
FIG. 8B is a flowchart showing an example process flow of the multifunction peripheral after receipt of execution instruction of printing from the user according to the second embodiment.
Figure 8A:
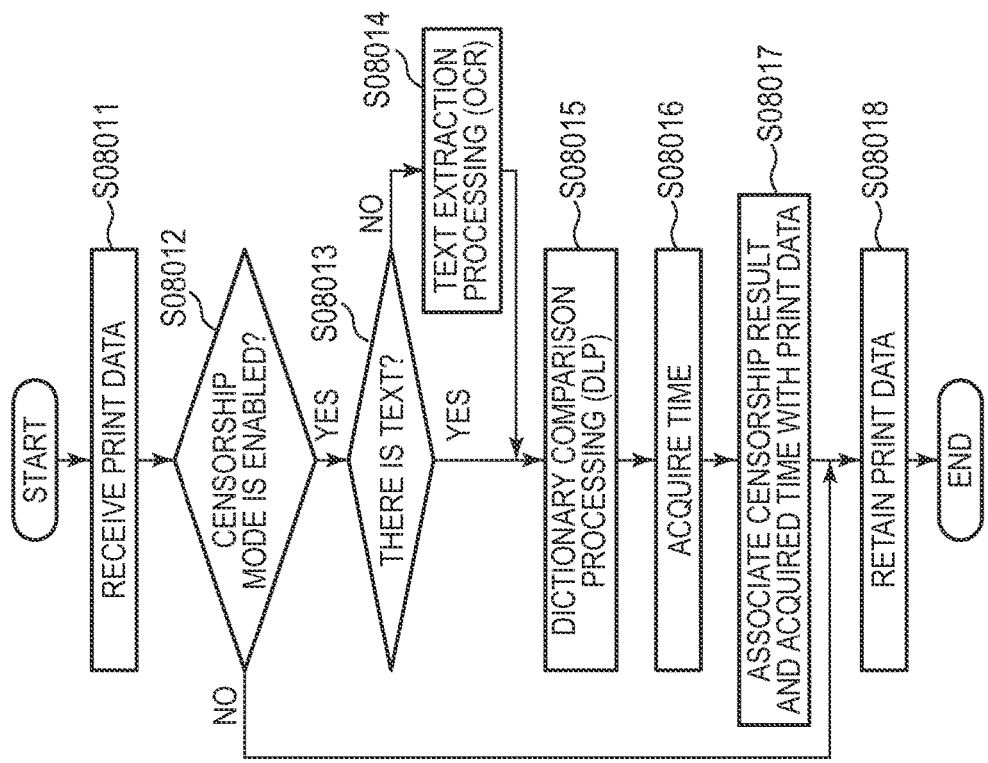
FIG. 8A is a flowchart showing an example process flow of the multifunction peripheral from print data entry to retention according to a second embodiment.

FIG. 8A shows a flowchart of a process flow from the time when the print data is entered to the time when the print data is retained in the MFP 1000 according to the second embodiment. The program for implementing the operation described in the present flowchart is stored in the flash memory 215, and the program is deployed and executed in the RAM 213 by the CPU 211.

The processes in steps S08011 to S08015 are the same as steps S05011 to S05015 in the first embodiment, respectively. In step S08016, the time at which the dictionary comparison processing (DLP) of step S08015 is performed is acquired.

Subsequently, in step S08017, the print job is associated with the censorship result determined in step S08015 and the time acquired in step S08016, and is retained in a storage medium such as the flash memory 215 or the HDD 214 in step S08018. The print data retained in step S08018 may be PDL data, a raster image after rendering processing by the RIP unit 221, or may be retained in the state that the text information extracted in step S08014 is present.

FIG. 8B shows a flowchart of the process flow of the MFP 1000 from the time when the MFP 1000 receives the execution instruction of printing to the time when the MFP 1000 prints the print data in the system according to the second embodiment. The program for implementing the operation described in the present flowchart is stored in the flash memory 215 and is deployed and executed in the RAM 213 by the CPU 211.

First, in step S08021, the MFP 1000 receives the execution instruction of printing from the user. Next, in step S08022, it is determined whether or not the censorship mode is enabled. If the censorship mode is enabled (YES in S08022), the process proceeds to step S08023. On the other hand, if the censorship mode is disabled (NO in S08022), the process proceeds to step S08028.

In step S08023, the main controller 200 confirms whether the censorship result is associated with the print job for which the execution instruction of printing was operated in step S08021. If the censorship result is associated with the print job (YES in S08023), the process proceeds to step S08025. On the other hand, if the censorship result is not associated with the print job (NO in S08023), the process proceeds to step S08024. In step S08024, the data censorship processing unit 319 performs text extraction processing (OCR) on the print data. Even if the print job is not associated with the censorship result in S08023, the text extraction process in S08024 may be omitted if the print job includes text information.

In step S08025, the main controller 200 compares the time associated with the print data in step S08017 with the last update time of the pre-registered words. As a result, it is determined whether or not the censorship is performed based on the latest pre-registered words. If the censorship is performed based on the latest pre-registered words (YES in S08025), the process proceeds to step S08027. On the other hand, if the censorship is not performed based on the latest pre-registered words (NO in S08025), the process proceeds to step S08026. Specifically, when the update time of the pre-registered words is later than the time associated with the print data, or when there is no time associated with the print data, it is necessary to perform censorship (S08026) based on the latest pre-registered words.

Step S08026 is the same as step S05015, and the text information in the print data is compared with the pre-registered words again.

In step S08027, the main controller 200 confirms the censorship result. If the censorship result is printable (YES in S08027), the process proceeds to step S08028 to execute printing. On the other hand, if the censorship result is not printable (NO in S08027), the process proceeds to step S08029. In step S08029, since the text information matching the pre-registered words is in the print data by the censorship processing, the operation unit 230 of the MFP 1000 displays that the censorship result is not printable.

As described above, even if the pre-registered words are updated or the censorship mode is set, the censorship processing can be performed in the latest setting state. If it is necessary to perform the censorship processing after receiving the execution instruction of printing, a screen (not shown) indicating that the censorship processing is performed may be displayed on the operation unit 230 of the MFP 1000.

In the second embodiment, the censorship whether or not has been performed using the latest pre-registered words is determined based on comparing the time associated with the print data with the last update time of the pre-registered words. However, the determination may be performed by other methods. For example, it may be determined whether or not the censorship has been performed using the latest pre-registered words by assigning version information to pre-registered words and comparing the version information of the pre-registered words. More specifically, the version information is updated in response to updating the pre-registered words, and then the version information of the pre-registered words used in the dictionary comparison processing of step S08015 is acquired in step S08016.

Subsequently, in step S08017, the censorship result and the version information of the acquired pre-registered words are associated with the print data. When the execution instruction of printing is received from the user, the version information of the pre-registered words associated with the print data is compared with the version information of the latest pre-registered words in S08025 to determine whether or not the censorship is performed using the latest pre-registered words. When the versions match, the process proceeds to step S08027. On the other hand, when the versions do not match, the dictionary comparison processing is executed by using the current pre-registered phrase in step S08026.

In addition, in a method other than the above, the censorship whether or not has been performed using the latest pre-registered words (character string) is determined based on comparing the checksum of the pre-registered words (character string) with the checksum of the latest pre-registered words (character string). A checksum is an error detection code that can confirm the identity of a file. Specifically, in S08016, the checksum of the character string used when the dictionary comparison processing is executed in S08015 is acquired. Subsequently, the censorship result and the checksum are associated with the print data in S08017. When the execution instruction of printing is received from the user, the checksum of the character string associated with the print data and the checksum of the latest character string are compared in S08025 to determine whether or not the censorship is performed based on the latest pre-registered character string. When the checksum matches (YES in S08025), the process proceeds to S08027. On the other hand, when the checksum does not match (NO in S08025), the dictionary comparison processing is executed using the latest character string in S08026. The determination of whether or not the censorship has been performed using the latest pre-registered words (character string) may be configured as described above.

Third Embodiment

Next, a third embodiment of the present disclosure will be described. In the first embodiment and the second embodiment, a description has been given of a case in which the censorship processing is executed when printing is performed by the retained print. However, the MFP 1000 has not only a printing function but also various functions such as a scan data transmission function, a FAX function, a stored document transmission function, and a data transmission to an external storage. For example, BOX storing is often used to print data stored in a BOX after a period of time elapses after a user enters (stores) data into the BOX. In such a case, it is not necessary to perform the censorship processing immediately after receiving the print data.

Therefore, in the third embodiment, a control for changing the timing of the censorship processing according to the printing function of the MFP 1000 will be described. In the third embodiment, the network configuration diagram, the hardware configuration of the MFP 1000 which is an information processing apparatus, the software configuration, the reception of the execution instruction of printing, the print processing such as the execution of printing, and the like are the same as those in the first embodiment.

Figure 9B:
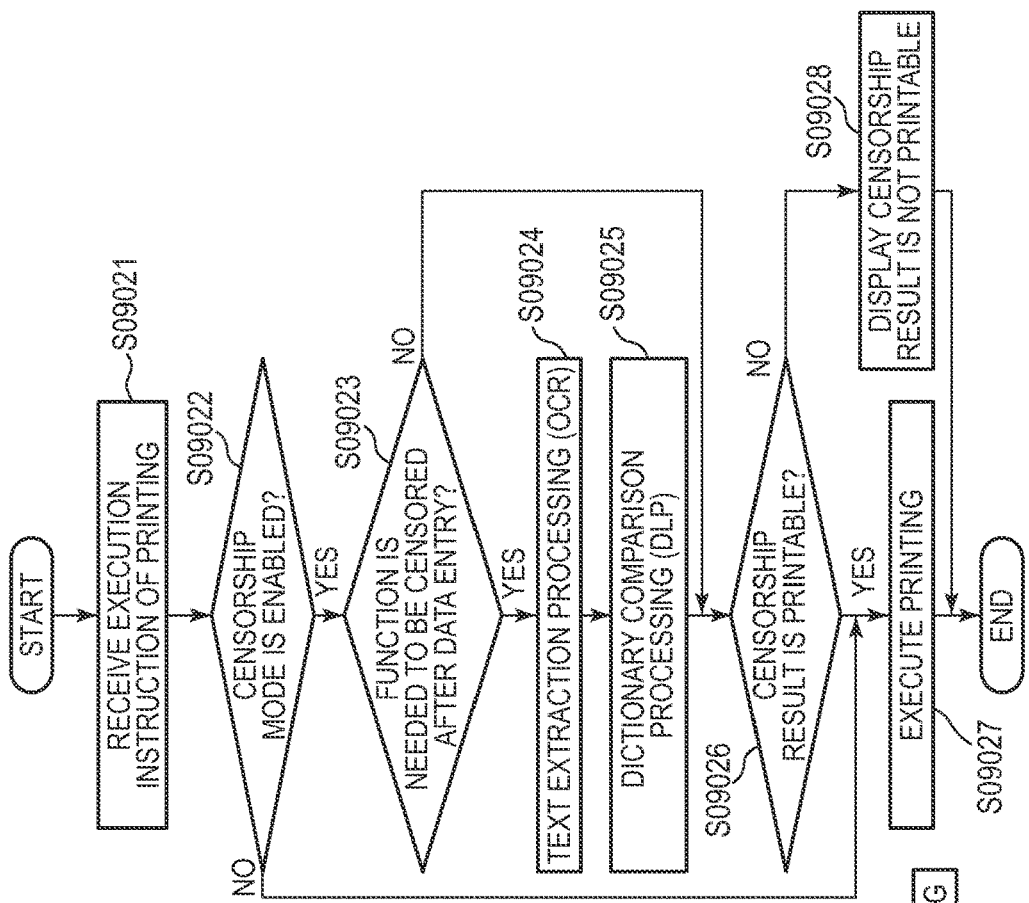
FIG. 9B is a flowchart showing an example process flow of the multifunction peripheral after receipt of execution instruction of printing from the user in the third embodiment.
Figure 9A:
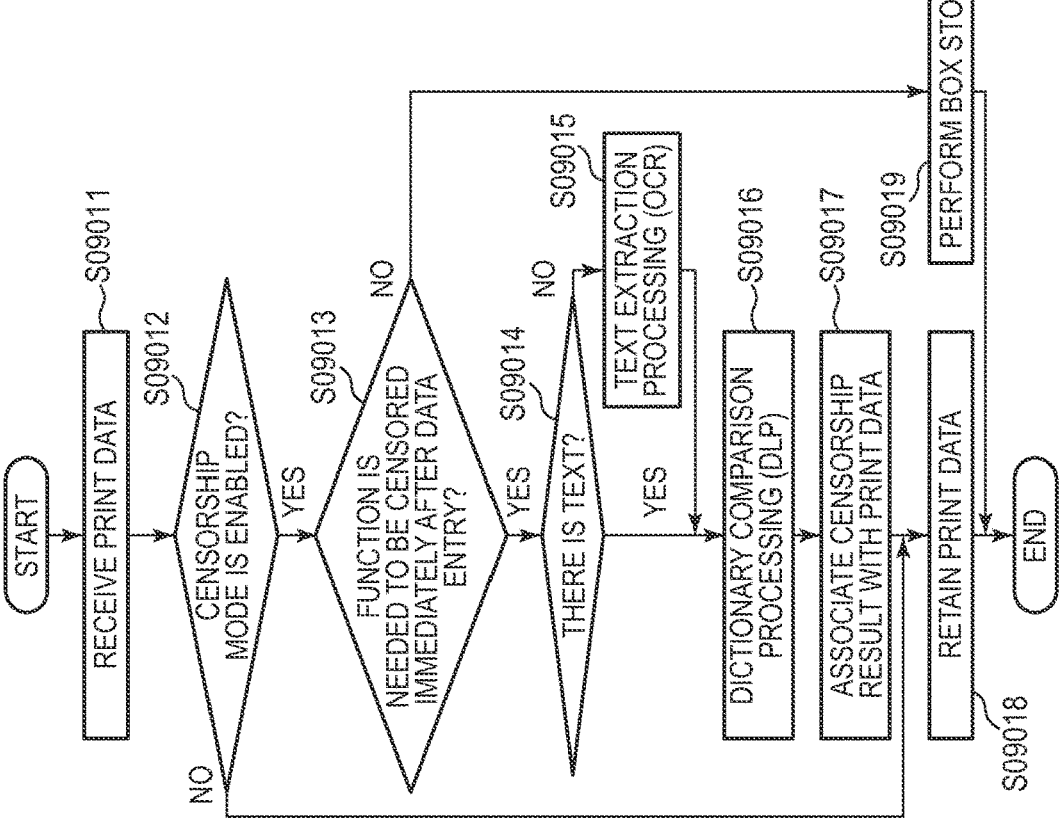
FIG. 9A is a flowchart showing an example process flow of the multifunction peripheral from print data entry to retention according to a third embodiment.

FIG. 9A shows a flowchart of a process flow performed by the MFP 1000 from the reception of print data from the PC 2000 to the retention of print data with respect to the MFP 1000 in the system according to the third embodiment.

Steps S09011 and S9012 are the same as steps S05011 and S05012 of the first embodiment, respectively.

Figure 10:
FIG. 10 is an illustration of an example table that links the function included in the multifunction peripheral with the censorship timing according to one embodiment.

In step S09013, the main controller 200 of the MFP 1000 determines whether the function corresponding to the job type needs to be censored immediately after data entry by determining the job type of the received print job. Specifically, the main controller 200 determines the censorship timing using the table shown in FIG. 10. FIG. 10 shows an example of a table in which the printing function of the MFP 1000 is associated with the censorship timing. The administrator managing the MFP 1000 registers the table and stores it in the censorship setting management unit 318. In FIG. 10, as an example, BOX storing is described as a function that does not need to perform the censorship immediately, but it is not limited to other functions that do not need to perform the censorship immediately.

Specifically, the main controller 200 determines the attribute information of the received print data from the header portion of the print data, and refers to the table shown in FIG. 10. Thus, it is determined whether or not it is necessary to censor the received print data following the entry of the print data. If the censorship timing is a necessary function following the entry of the print data (YES in S09013), the process proceeds to step S09014. If the censorship timing is not a necessary function following the entry of the print data (NO in S09013), the censorship processing is not performed, and the box storing is performed in step S09019.

Steps S09014 to S09018 are the same as steps S05013 to S05017 of the first embodiment.

FIG. 9B shows a flowchart of a process flow of the MFP 1000 from the time when the MFP 1000 receives the execution instruction of printing from the time when the MFP 1000 executes printing.

In step S09021, the MFP 1000 receives the execution instruction of printing from the user, and the process proceeds to step S09022.

In step S09022, the main controller 200 confirms whether the censorship mode of the MFP 1000 is enabled. If the censorship mode is enabled (YES in S09022), the process proceeds to step S09023. On the other hand, if the censorship mode is disabled (NO in S09022), the process proceeds to step S09027, and printing is executed.

In step S09023, the main controller 200 of the MFP 1000 determines whether the function corresponding to the print job that has received the execution instruction of printing needs to be censored immediately after the print execution instruction. Specifically, the main controller 200 determines the censorship timing using the table shown in FIG. 10. If it is not necessary to perform the censorship processing immediately after the print execution instruction (NO in S09023), the process proceeds to step S09026. On the other hand, if it is necessary to perform the censorship processing immediately after the execution instruction of printing (YES in S09023), the process proceeds to step S09024. Steps S09024 to S09025 are the same as steps S05014 to S05015 of the first embodiment. Steps S09026 to S09028 are the same as steps S05022 to S05024 of the first embodiment.

In a case where the function corresponding to the print job is not the function for executing the censorship processing when the execution instruction of printing in S09023, the censorship whether or not has been performed using the latest pre-registered words (S08025 in the second embodiment) may be further determined.

Thus, the censorship timing can be changed by the function of the MFP 1000. As a result, it is possible to prevent the trouble of re-censorship associated with the update of the pre-registered words for functions that do not require the censorship processing following the entry of print data.

Fourth Embodiment

Figure 11:
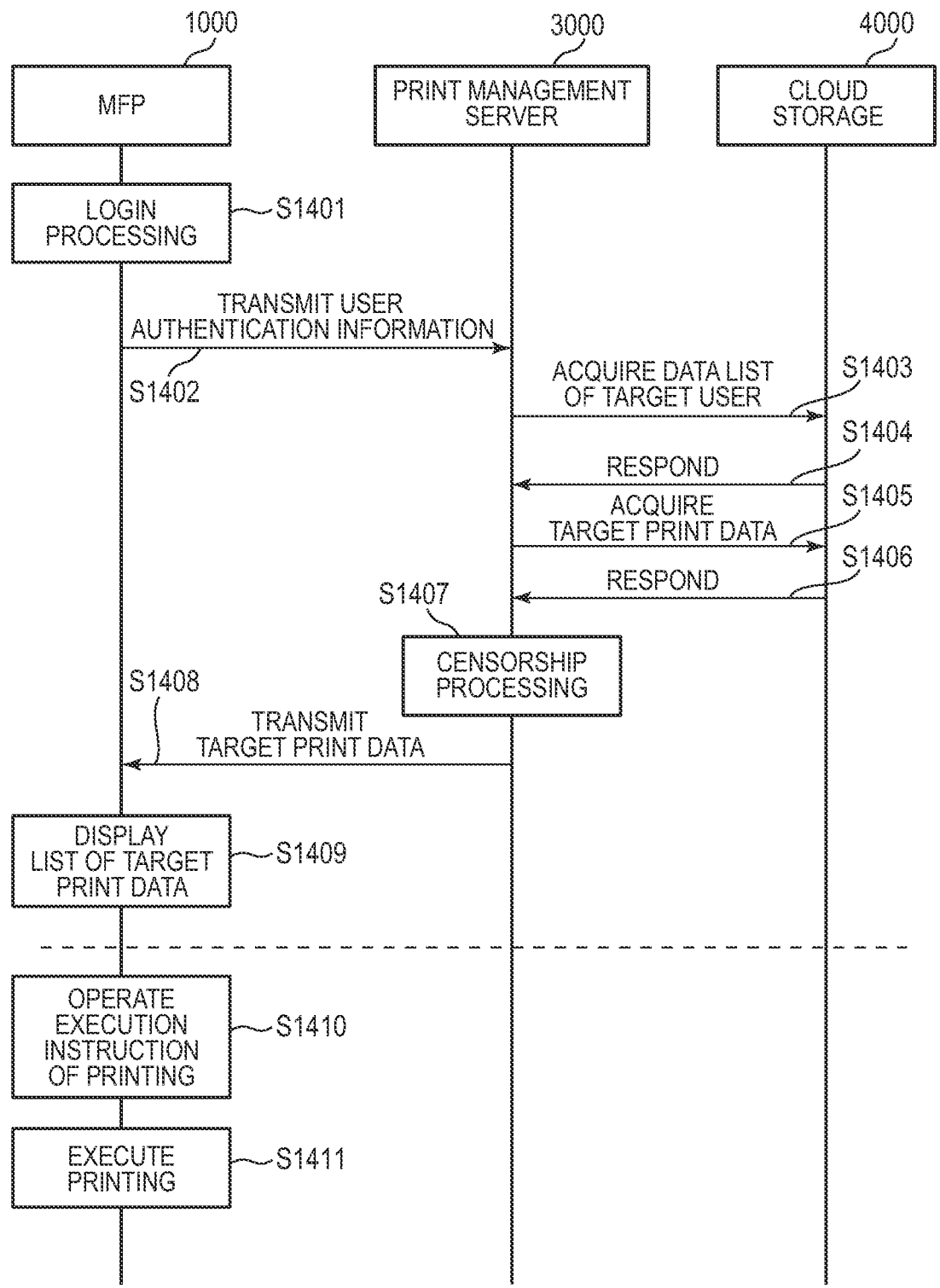
FIG. 11 is a flowchart showing an example of data censorship processing performed by the print management server according to a fourth embodiment.

Next, a fourth embodiment of the present disclosure will be described. FIG. 11 shows a sequence diagram of a flow of overall processing in the system according to the first embodiment in which the print management server 3000 performs data censorship of print data of a target user after user authentication of the MFP 1000.

In the fourth embodiment, there are an MFP 1000 which performs user authentication, reception of the execution instruction of printing by an operation unit, and print control, and a cloud storage 4000 in which data to be printed is stored. Further, there is a print management server 3000 which acquires data to be printed from the cloud storage 4000 based on the user information transmitted from the MFP 1000 and presents the printing object to the MFP 1000.

Although the MFP 1000 is separated from the print management server 3000 in the fourth embodiment, the function of the print management server 3000 may be included in the MFP 1000. Further, although the print management server 3000 refers to the cloud storage 4000, it may refer to an on-premises file server, a plurality of cloud storage and servers, and the storage and reference destinations of the data to be printed are not limited. This sequence is started in response to a request for login processing by the user to the MFP 1000.

First, in step S1401, the MFP 1000 receives login processing from the user and receives input of user information and a password from the user. The password associated with the user information managed by user authentication stored in the MFP 1000 is compared with the inputted password to verify whether the password is correct. When it is determined that the password is correct, the MFP 1000 permits log-in, and stores log-in user information.

Next, in step S1402, the MFP 1000 transmits the user authentication information of the authenticated user to the print management server 3000. In step S1403, the print management server 3000 transmits a request to the cloud storage 4000 to acquire a data list to be printed by the target user. The data list in the fourth embodiment is a list in which, for example, file names, file formats, update dates and times, and the like may be included, but the list is not particularly limited.

In step S1404, the print management server 3000 receives the data list from the cloud storage 4000. In step S1405, the print management server 3000 transmits a request to acquire target print data to the cloud storage 4000 based on the list of the target print data stored in the RAM 403.

Next, in step S1406, the print management server 3000 receives the print data from the cloud storage 4000 and stores the print data in the HDD 404. In step S1407, the print management server 3000 performs data censorship processing on the received print data.

Figure 12:
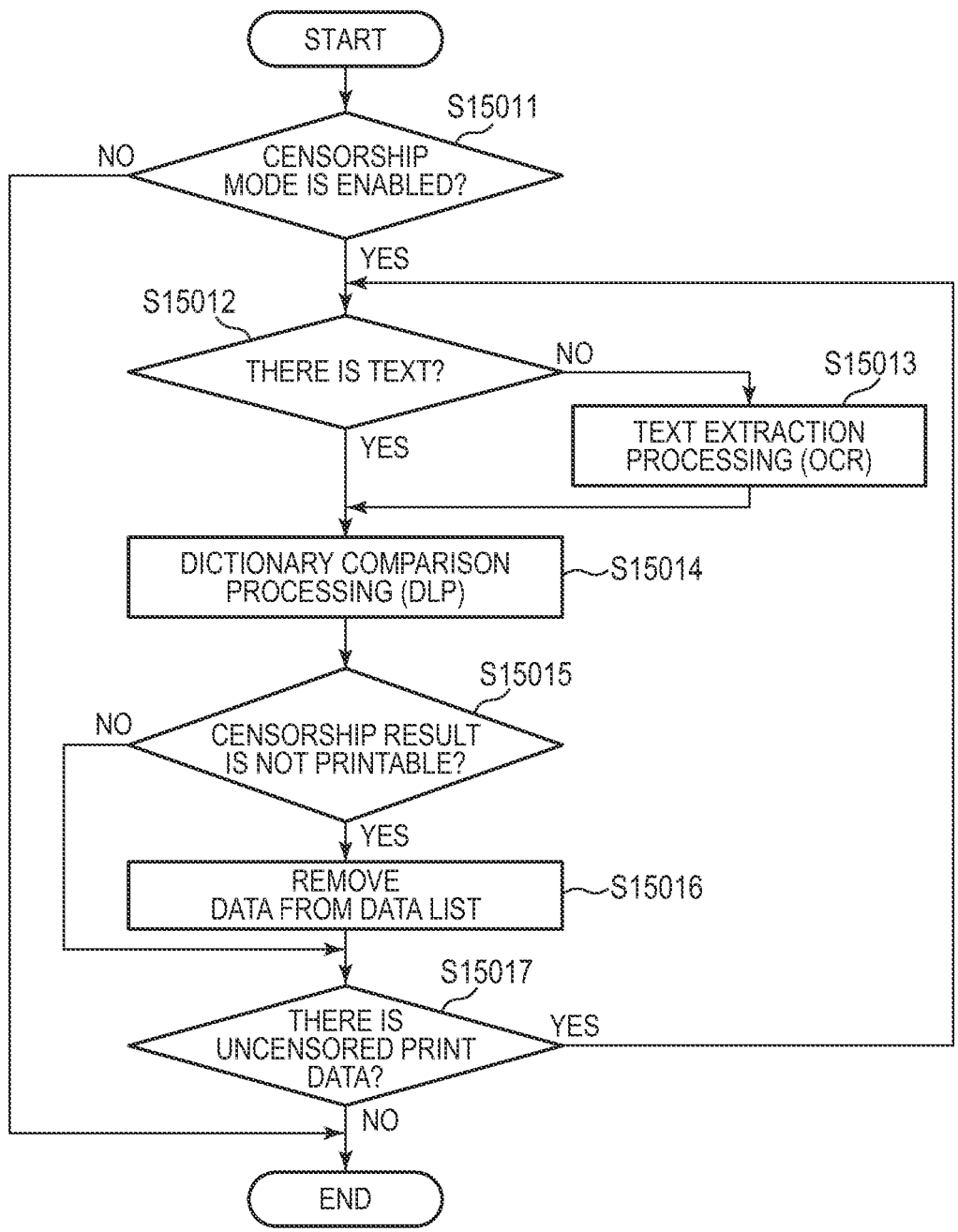
FIG. 12 is a flowchart showing details of the data censorship processing according to the fourth embodiment.
Figure 14:
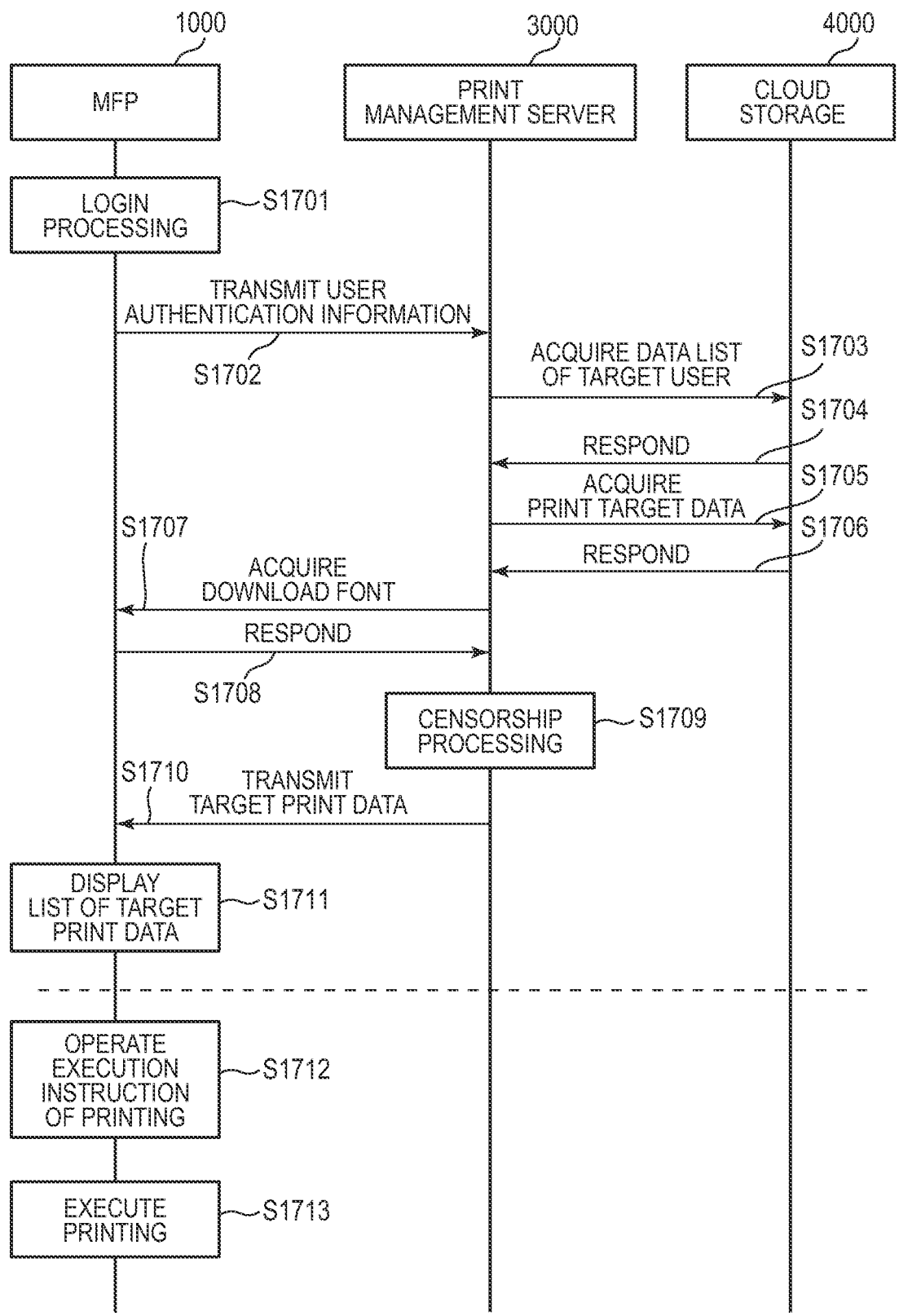
FIG. 14 is a sequence diagram showing an example of the data censorship processing performed by the print management server according to the fifth embodiment.

FIG. 12 shows a flowchart for explaining details of the data censorship processing in step S1407 of FIG. 14. The program for implementing the operation described in this flowchart is stored in one of the storage means of the ROM 402, the RAM 403, and the HDD 404, and executed by the CPU 401.

First, in step S15011, the print management server 3000 acquires the censorship mode based on the setting value registered by the censorship setting management unit 503 to confirm whether the censorship mode is enabled or not. If it is determined in step S15011 that the censorship mode is enable (YES in S15011), the process proceeds to step S15012. If it is determined in step S15011 that the censorship mode is disabled (NO in S15011), the process is terminated without performing the censorship processing.

In step S15012, the data censorship processing unit 502 determines whether there is text for the print data. If it is determined that there is no text (NO in S15012), the process proceeds to step S15013. On the other hand, if there is text (YES in S15012), the process proceeds to step S15014.

In step S15013, the data censorship processing unit 502 performs text extraction processing (OCR) on the print data, and the process proceeds to step S15014. In step S15014, it is determined whether or not the pre-registered words exist in the text of the print data.

In step S15015, the censorship result is determined. If the pre-registered words exist in the text of the print data (YES in S15015), it is determined that the censorship result is not printable, and the process proceeds to step 15016. If there is no pre-registered words in the text of the print data (NO in S15015), it is determined that the censorship result is printable, and the process proceeds to step S15017.

In step S15016, processing is performed to remove the data whose censorship result is not printable in step S15015 from the data list. Then, the process proceeds to step S15017.

In step S15017, if there is uncensored print data in the HDD 404 (YES in S15017), the process returns to step S15011, and the data censorship processing is continued for the uncensored print data. In step S15017, if there is no uncensored print data in the HDD 404 (NO in S15017), the process is terminated.

In step S1408, the print management server 3000 transmits the print data to the MFP 1000. The MFP 1000 stores the received print data. In step S1409, the MFP 1000 displays the received print data. In step S1410, the MFP 1000 receives the execution instruction of printing from the user for the displayed print data. In step S1411, the MFP 1000 prints the print data instructed to be printed.

According to the fourth embodiment, the data content of the print data of the user in the external storage is confirmed at the time of user authentication to ensure security and to prevent the user from increasing the time until the print completion.

Fifth Embodiment

Next, a fifth embodiment of the present disclosure will be described. In the fourth embodiment, an example of censoring the print data stored in the external storage by the print management server has been described. However, when the print data is in PDL format, it is difficult to censor the data because PDL analysis cannot be performed in a general configuration of a print management server. In the fifth embodiment, an example of censoring the PDL format print data stored in the external storage by the print management server will be described. Since the system configuration and the hardware configuration are the same as those of the first embodiment, the description of FIGS. 1, 2A, and 2B will be omitted in the description that follows.

Figure 13:
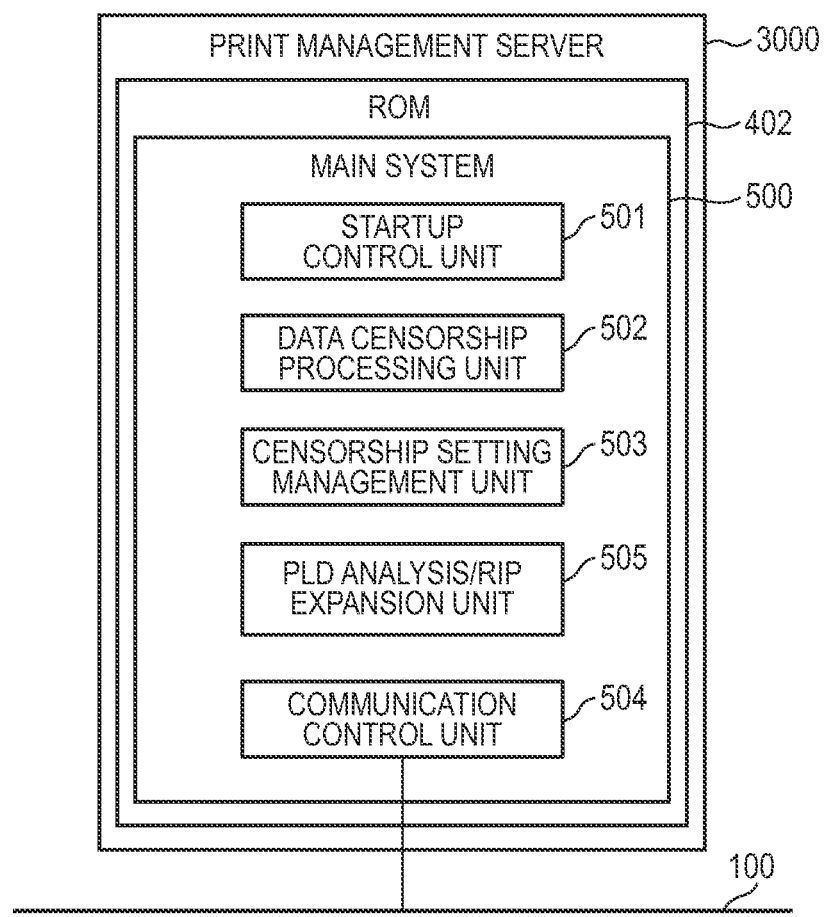
FIG. 13 is a block diagram showing an example of a software module block of the print management server according to a fifth embodiment.

FIG. 13 is a block diagram showing software modules included in one configuration of the print management server 3000 according to the first embodiment. The software modules in FIG. 13 are implemented by executing a program deployed in the RAM 403 by the CPU 401.

Reference numeral 501 to 504 in FIG. 13 is substantially the same as that in the first embodiment, and therefore description thereof will be omitted. The PDL analysis/RIP expansion unit 505 is a module for analyzing print data in PDL format using a PDL resource such as a font, performing RIP processing, and generating image data in bitmap format. In the following sequence and flowchart, the portion to be processed by the print management server 3000 is stored in one of the storage means of the ROM 402, the RAM 403, and the HDD 404, and executed by the CPU 401.

FIG. 14 shows a sequence diagram of the overall processing in the system according to the present embodiment in which the print management server 3000 performs censorship of the print data of the target user after the user authentication of the MFP 1000.

First, since steps S1701 to S1706 are substantially the same as steps S1401 to S1406 of the fourth embodiment, description thereof will be omitted. In step S1707, the MFP 1000 is requested to acquire a PDL resource such as a download font necessary for the PDL interpretation stored. In step S1708, the download font transmitted by the MFP 1000 is received. Next, in step S1709, the print management server 3000 performs the censorship processing on the received print data.

Figure 15:
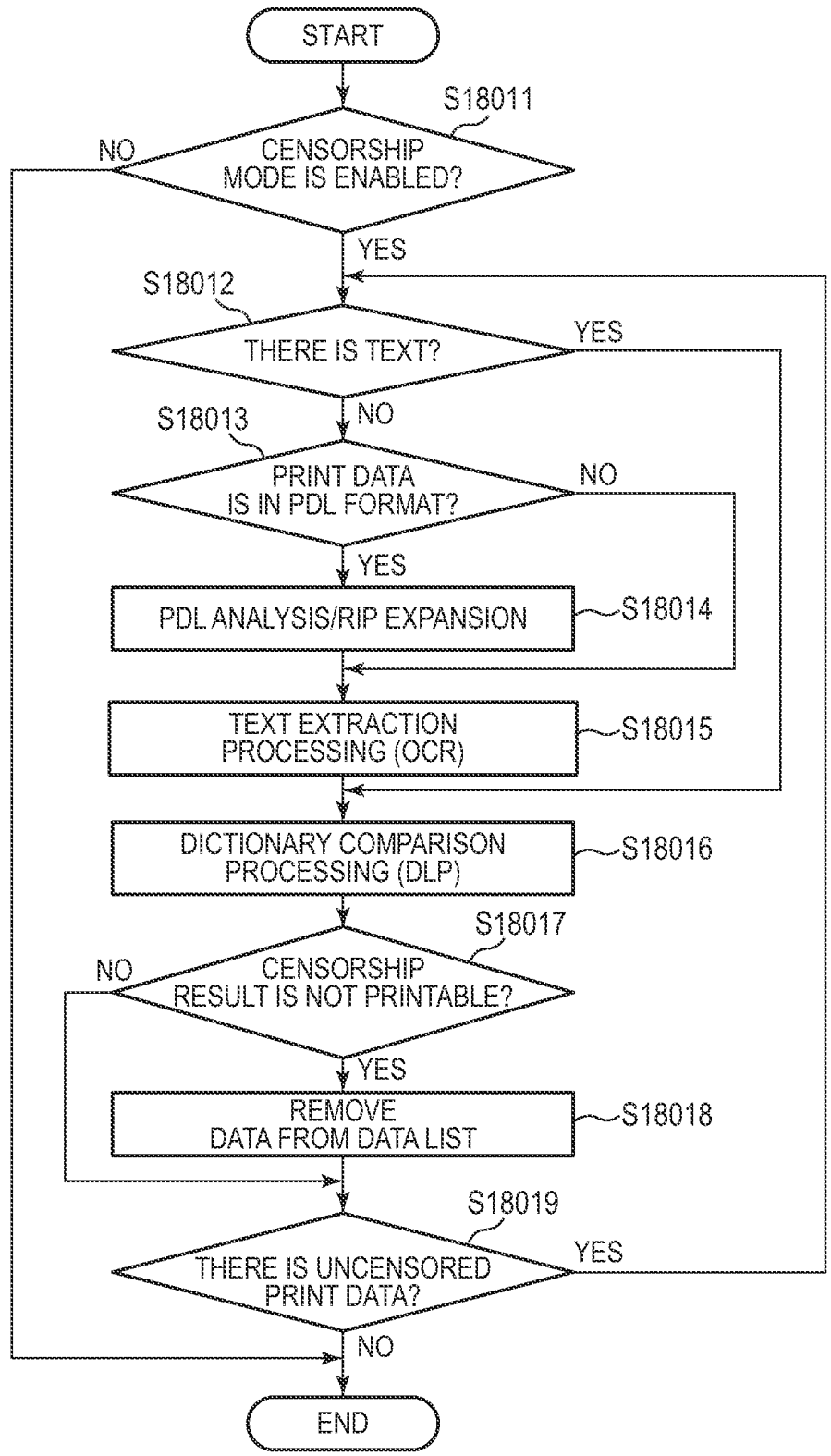
FIG. 15 is a flowchart showing details of the data censorship processing in the fifth embodiment.

FIG. 15 shows a flowchart for explaining the censorship processing in step S1709 of FIG. 14. The program for implementing the operation described in the present flowchart is stored in one of the storage means of the ROM 402, the RAM 403, and the HDD 404, and executed by the CPU 401.

First, since steps S18011 to S18012 are substantially the same as steps S15011 to S15012 of the first embodiment, description thereof will be omitted. In step S18013, if it is determined that the print data is in the PDL format by looking at the header information of the print data, the process proceeds to step S18015. On the other hand, if the print data is not in the PDL format, the process proceeds to step S18015.

In step S18014, the PDL analysis of the print data is performed using the font acquired from the MFP 1000, and RIP expansion is performed to generate image data in bitmap format. Steps S18015 to S18019 after the PDL analysis and RIP expansion processing are substantially the same as steps S15013 to S15017 of the first embodiment, and therefore description thereof is omitted. Steps S1710 to S1713 after the data censorship processing are substantially the same as steps S1408 to S1411 of the first embodiment, and therefore the description thereof is omitted.

According to the present embodiment, at the time of user authentication, the data content of the print data in the PDL format of the user stored in the external storage is checked to ensure security, and thus the time until the print completion for the user is not increased.

According to various embodiments of the present disclosure, information leakage can be prevented without increasing the time from receipt of the execution instruction of printing from the user to the completion of printing.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-100274, filed Jun. 16, 2021, and Japanese Patent Application No. 2022-062254, filed Apr. 4, 2022, which are hereby incorporated by reference herein in their entirety.

What is claimed is:

1. An image forming apparatus comprising:
an operation unit; and
one or more controllers having one or more processors and one or more memories, the one or more controllers configured to:
register strings;
receive job data;
determine a job availability of the received job data based on a comparison of text information from the received job data with the registered strings before reception of an execution instruction of the received job data;
store the received job data associated with the result of the determination of job availability of the received job data; and
control an execution of the received job data based on the result of the determination of job availability in response to receiving the execution instruction of the received job data via the operation unit.

2. The image forming apparatus according to claim 1, wherein the strings are updated after determining the job availability, and
wherein the execution instruction of the received job data is received and controlled based on a result of the determination of job availability, wherein the job availability of the received job data is determined using the updated strings.

3. The image forming apparatus according to claim 2, wherein the one or more controllers are further configured to acquire date and time of update in response to updating of the registered strings, wherein date and time are stored when the job availability associated with the received job data is determined, and wherein, in response to receiving the execution instruction of the received job data from the operation unit, it is determined whether or not the registered strings have been updated after the determination of the job availability, based on a comparison of the acquired date and time of the update with the date and time when the determination of the job availability was made.

4. The image forming apparatus according to claim 2, wherein version information of the registered strings is stored in association with the received job data, and wherein, in response to receiving the execution instruction of the received job data from the operation unit, it is determined whether or not the registered strings have been updated after the determination of the job availability, based on a comparison of the stored version information with latest version information of the registered strings.

5. The image forming apparatus according to claim 2, wherein checksum of the received job data including the registered strings is stored in association with the received job data, and wherein, in response to receiving the execution instruction of the received job data from the operation unit, it is determined whether or not the registered strings have been updated after the determination of the job availability, based on a comparison of the stored checksum of the received job data including the registered strings with checksum of the received job data including latest registered strings.

6. The image forming apparatus according to claim 1, wherein the registered strings are registered by an administrator managing the image forming apparatus.

7. The image forming apparatus according to claim 1, wherein the received job data is executed when the result of the determination of job availability associated with the received job data indicates that the received job data is executable.

8. The image forming apparatus according to claim 1, wherein the one or more controllers are further configured to notify that the received job data is not executable, and wherein when the result of the determination of job availability associated with the received job data indicates that the received job data is not executable, the execution of the received job data is restricted and an error screen is displayed.

9. The image forming apparatus according to claim 8, wherein when the result of the determination of job availability associated with the received job data indicates that the received job data is not executable, the execution of the received job data is restricted and an administrator managing the image forming apparatus is notified.

10. The image forming apparatus according to claim 1, wherein the received job data associated with the result of the determination of job availability is temporarily stored.

11. The image forming apparatus according to claim 1, wherein the image forming apparatus is communicably connected to an external device, and wherein the received job data is print data received from the external device.

12. The image forming apparatus according to claim 1, wherein the one or more controllers are further configured to scan data, and wherein the received job data is scanned scan data.

13. The image forming apparatus according to claim 1, wherein the one or more controllers are further configured to print image on a sheet, and wherein the execution of the received job data involves printing an image included in the received job data.

14. The image forming apparatus according to claim 1, wherein the image forming apparatus is communicably connected to an external device, and wherein the execution of the received job data involves transmitting the received job data to the external device.

15. The image forming apparatus according to claim 1, wherein the one or more controllers are further configured to determine job type of the received job data, and wherein the job availability of the received job data is determined when the determined job type is a job type for which a job availability of the received job data is to be determined when the job data is received.

16. The image forming apparatus according to claim 1, wherein the one or more controllers are further configured to extract the text information from an image included in the received job data.

17. A control method for an image forming apparatus having an operation unit and a storing unit, the control method comprising:

registering strings;

receiving job data;

determining a job availability of the received job data based on a comparison of text information from the received job data with the registered strings before reception of an execution instruction of the received job data;

storing, in the storing unit, the received job data associated with the result of the determination of job availability of the received job data; and controlling an execution of the received job data based on the result of the determination of job data availability in response to receiving the execution instruction of the received job data via the operation unit.

* * * * *